US007392211B2

(12) United States Patent  (10) Patent No.: US 7,392,211 B2
Shlafman et al.  (45) Date of Patent: Jun. 24, 2008

(54) ANALYSIS OF FINANCIAL DERIVATIVES

(75) Inventors: Shlomo Shlafman, Haifa (IL); Boris Bachelis, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1555 days.

(21) Appl. No.: 09/768,697

(22) Filed: Jan. 23, 2001

(65) Prior Publication Data

US 2002/0065755 A1 May 30, 2002

Related U.S. Application Data

(60) Provisional application No. 60/202,793, filed on May 9, 2000.

(51) Int. Cl.
*G06Q 40/00* (2006.01)
(52) U.S. Cl. .......................................... 705/35; 705/37
(58) Field of Classification Search ................ 705/35, 705/37
See application file for complete search history.

(56) References Cited

OTHER PUBLICATIONS

Tucker et al., The Probability Distribution of Foreign Exchange Price Changes, 1986.*

Wilmott et al., "The Mathematics of Financial Derivatives: A Student Introduction" (Cambridge University Press, 1995).

Feller, "An Introduction to Probability Theory and Its Applications" (Wiley International Edition, 1968).

U.S. Appl. No. 60/202,793, filed May 8, 2000, Admursky et al.

J.C.Hull, "Options, Futures and Other Derivatives", Third Edition, Prentice-Hall, 1977. pp. 457-489, 229-260.

\* cited by examiner

*Primary Examiner*—James P. Trammell
*Assistant Examiner*—Daniel L Greene, Jr.
(74) *Attorney, Agent, or Firm*—Darby & Darby PC (57) ABSTRACT

A method for trading in a financial derivative of an underlying asset includes determining a trend predictive of a future value of the asset and a predicted variance of the future value. Responsive to the trend and the variance, a density function is calculated, which is indicative of a probability distribution of the value at a first time in the future. Based on the density function at the first time, the density function is recalculated to find the probability distribution of the value at a second time, subsequent to the first time, and a trading decision is made with regard to the derivative of the asset based on the density function.

15 Claims, 6 Drawing Sheets

ANALYSIS OF FINANCIAL DERIVATIVES

CROSS-REFERENCE TO RELATED APPLICATIONS

This application claims the benefit of U.S. Provisional Patent Application No. 60/202,793, filed May 9, 2000, whose disclosure is incorporated herein by reference.

FIELD OF THE INVENTION

The present invention relates generally to methods and systems for prediction, and specifically to methods for making purchase and exercise decisions with respect to financial derivatives based on future distribution of the value of an underlying asset.

BACKGROUND OF THE INVENTION

A wide and growing range of different types of derivatives is available in financial markets around the world. Broadly speaking, a derivative is an option to buy or sell an underlying asset in the future at a given exercise price, which may be fixed in advance or determined by conditions yet to occur. The asset typically comprises a financial instrument, such as a share, collection of shares or bonds traded on a public market. There are also derivatives based on other assets or instruments, such as commodities, currency values, share price indices and even other derivatives. In the context of the present patent application and in the claims, the term "asset" refers to any and all such entities that may underlie a given derivative. The challenge for the trader in derivatives is to determine, based on the price and expected behavior of the underlying asset, whether the current purchase price of the derivative is justified by the profit that is likely to be made from its future exercise and the potential risk.

The simplest type of derivative is known as a European "vanilla" option. It gives the buyer the right to buy ("call") or sell ("put") the underlying asset at a certain fixed time in the future at a given exercise price. The buyer should purchase the option if the expected difference between the exercise price and the actual price of the asset at the specified time of exercise is greater than the current price of the option while the risk is within defined limits. American options allow the buyer to buy or sell the asset at the specified price at any time in the future, typically up to a certain fixed time limit. In this case, the buyer must decide both whether the current option price is justified and, after buying the option, when is the best time to exercise it.

While traditional European and American vanilla options specify a fixed exercise price and conditions, path-dependent options can have variable exercise prices and conditions, which depend on the behavior of the underlying asset over time. Such exotic options are described at greater length by Hull, in *Options, Futures and Other Derivatives* (Prentice Hall, 1977), pages 457-489, which is incorporated herein by reference. In Asian options, for example, the exercise price is based on an average price of the underlying asset, taken over a certain period prior to exercise. Another example of a path-dependent option is the barrier option, which becomes exercisable only when the price of the underlying instrument rises above or falls below a given threshold.

Even the simplest vanilla options pose a substantial challenge to the derivatives trader, because of the volatile nature of share price values in the stock markets. In deciding whether and when to buy, sell or exercise a given derivative, the trader must assess the trends driving the price of the underlying instrument and the likely variability of the price. These assessments must be factored into a model that can form the basis of a trading strategy that maximizes the profitability of the investment. Models used for this purpose typically view the asset price as a stochastic process.

Various methods are known in the art for determining the stochastic behavior of a process (S) over time (t), based on a trend function $\mu(S,t)$ and a variance function $\sigma(S,t)$. In the simplest case, S is a scalar, representing the price of a given asset over time. This simplistic model does not reflect the complex reality of financial markets, however. More generally, S is a vector that includes a number of related economic or financial factors, so that $\mu(S,t)$ is similarly a vector, and $\sigma(S,t)$ is a covariance matrix. The change in S over time is modeled as a multidimensional Wiener process, given by:

$$dS=\mu(s,t)*dt+\sigma(s,t)*dW \qquad (1)$$

Here dW is a multidimensional Wiener differential, wherein each component of dW is distributed randomly with a normal probability density. This model is well known in the art and is described at greater length in the above-mentioned book by Hull, for example.

In order to evaluate a financial derivative based on S, it is necessary to solve equation (1), based on specified boundary conditions. Black and Scholes showed that when S can be treated as a scalar log-normal process, equation (1) can be used to derive a differential equation giving the price of a derivative contingent on S. The derivation of the Black-Scholes equation and its use in analyzing options are described by Hull on pages 229-260. There are many derivatives, however, to which the Black-Scholes analysis is not applicable, such as path-dependent and other exotic options and, more generally, processes that cannot be properly modeled as log-normal.

For these more complex analyses, a number of alternatives are known in the art, for example:
- Monte Carlo methods can be used to simulate the behavior of the underlying asset and/or derivative over time. Such simulation becomes extremely computation-intensive, however, when high accuracy is required, and small values of the time step dt must be used. Furthermore, Monte Carlo methods are not applicable to American-style path-dependent options.
- Numerical solutions of partial differential equations can be used to evaluate some types of derivatives, but they are very sensitive to choice of boundary conditions and are likewise demanding of computation resources.
- Binary and tertiary trees are useful particularly in some path-dependent assessments, but are limited in their ability to deal with multi-dimensional problems. They also require a great many nodes of the tree to be evaluated in order to achieve high accuracy.

A further limitation of all of these methods is that they typically provide only the expected value of the asset or derivative at a given time, without indicating the probability distribution of possible values about this expectation. This distribution can be very important in determining the risks associated with a given derivative.

SUMMARY OF THE INVENTION

Preferred embodiments of the present invention use a novel method to analyze the stochastic behavior of an asset, in order to predict a probability distribution of the asset as it varies over time. The method is applicable to both scalar and multivariate vector models governing the behavior of the asset, without limitation to log-normal or other fixed stochastic models. The probability distribution determined in this manner can be applied both to find the expected value of the asset and the risks associated with the derivative due to likely variation of the asset value. It thus enables traders in derivatives to make decisions on purchase and exercise with reduced risk and lower computational burden than are achieved by methods known in the art. It also allows a comparison and optimal choice to be made among different instruments based on the same underlying asset.

In preferred embodiments of the present invention, a Wiener process associated with the asset is evaluated in order to find a complete representation of a density function, which characterizes the probability distribution of the asset at each point in time over a given range. In other words, beginning from an initial distribution of asset values, the density function is found iteratively at each successive time increment. The complete density function at each increment is represented in a continuous finite element model by its value and first derivative as a function of the asset value, for a limited number of values of the asset. The density function at the next increment is determined by integrating over the current function, using a simplified random walk variable in place of the Wiener differential. These methods allow the density function (and hence the probability distribution) to be determined accurately and efficiently, with low computation burden.

In some preferred embodiments of the present invention, the probability distribution over time is used not only in purchase decisions regarding an option, but also to derive a strategy function with regard to exercise of the option. This strategy indicates to a holder of an American-style option, for example, when to exercise the option in order to maximize the expected profit, in response to variations in the price of the underlying asset over time.

In further preferred embodiments of the present invention, the density function is integrated over time in order to evaluate path-dependent instruments. Such integration provides a cumulative density function, which can be used both in making purchase decisions and in deriving strategy functions, as described above.

While preferred embodiments are described herein with reference to financial instruments and derivatives, the principles of the present invention are similarly applicable to analyses of stochastic processes of other types. Such applications of these principles are considered to be within the scope of the present invention.

There is therefore provided, in accordance with a preferred embodiment of the present invention, a method for trading in a financial derivative of an underlying asset, including:

determining a trend predictive of a future value of the asset and a predicted variance of the future value;

responsive to the trend and the variance, calculating a density function indicative of a probability distribution of the value at a first time in the future;

based on the density function at the first time, recalculating the density function to find the probability distribution of the value at a second time, subsequent to the first time; and making a trading decision with regard to the derivative of the asset based on the density function.

Preferably, recalculating the density function includes finding a change in the density function due to a stochastic process governing the value of the asset, wherein finding the change in the density function includes integrating a random variable representative of the stochastic process over the density function at the first time. Further preferably, the random variable has a plurality of discrete values with a normal probability distribution. Most preferably, the random variable includes a superposition of delta functions.

Additionally or alternatively, integrating the density function includes computing an integrated value of the function at each of a plurality of grid points in a coordinate space, wherein the value of the asset is represented by a coordinate in the space. Preferably, computing the integrated value includes, for each of the plurality of grid points, finding one or more corresponding points in the coordinate space at the first time, such that in a time step from the first time to the second time, the random variable makes a transition from the one or more corresponding points to the grid point at the second time, and determining the function at the grid point at the second time by summing over the density function at the corresponding points.

Alternatively or additionally, recalculating the density function includes interpolating the density function intermediate the grid points so as generate a smooth function over a selected range of calculation. Preferably, computing the integrated value includes computing the value and a first derivative of the density function at the second time, and interpolating the density function includes fitting polynomial functions between the grid points so as to match the value and the first derivative of the density function computed at each of the grid points. Most preferably, the method includes recalculating the density function at a third time, subsequent to the second time, using the polynomial functions fitted between the grid points at the second time.

Preferably, recalculating the density function includes iteratively recalculating the density function at each of a plurality of times from the first time up to a final time.

In a preferred embodiment, determining the trend includes finding a multivariate trend with respective to a plurality of related variables that include the value of the asset. Preferably, determining the variance includes finding a covariance matrix with respect to the plurality of related variables. Additionally or alternatively, the density function includes a multivariate function, based on at least some of the plurality of related variables, in a multidimensional coordinate space.

In a preferred embodiment, making the trading decision includes computing an expected value of the asset based on the density function. In another preferred embodiment, making the trading decision includes computing an expected yield of the financial derivative based on the density function. In still another preferred embodiment, making the trading decision includes deciding whether to carry out a transaction in the financial derivative at a given transaction price.

In yet another preferred embodiment, the financial derivative includes an option exercisable at any of a plurality of points in time, and making the trading decision includes determining at which of the points to exercise the option. Preferably, determining at which of the points to exercise the option includes calculating a strategy function, and deciding whether to exercise the option by comparing a current value of the asset to a value of the strategy function at one or more of the points in time.

In a further preferred embodiment, the derivative includes a path-dependent option, and recalculating the density function includes computing a path-dependent density function. Preferably, computing the path-dependent density function includes finding a cumulative density function indicative of a path-dependent probability distribution of a value of the option.

There is also provided, in accordance with a preferred embodiment of the present invention, apparatus for trading in a derivative of an underlying asset, including a decision processor, which is adapted, responsive to a trend predictive of a future value of the asset and to a predicted variance of the future value, to calculate a density function indicative of a probability distribution of the value at a first time in the future and, based on the density function at the first time, to recalculate the density function to find the probability distribution of the value at a second time, subsequent to the first time, and to provide an output for use in making a trading decision with regard to the derivative of the asset based on the density function.

There is additionally provided, in accordance with a preferred embodiment of the present invention, a computer software product for use in trading in a derivative of an underlying asset, the product including a computer-readable medium in which program instructions are stored, which instructions, when read by a computer, cause the computer, responsive to a trend predictive of a future value of the asset and to a predicted variance of the future value, to calculate a density function indicative of a probability distribution of the value at a first time in the future and, based on the density function at the first time, to recalculate the density function to find the probability distribution of the value at a second time, subsequent to the first time, and to provide an output for use in making a trading decision with regard to the derivative of the asset based on the density function.

The present invention will be more fully understood from the following detailed description of the preferred embodiments thereof, taken together with the drawings in which:

DETAILED DESCRIPTION OF PREFERRED EMBODIMENTS

Figure 1:
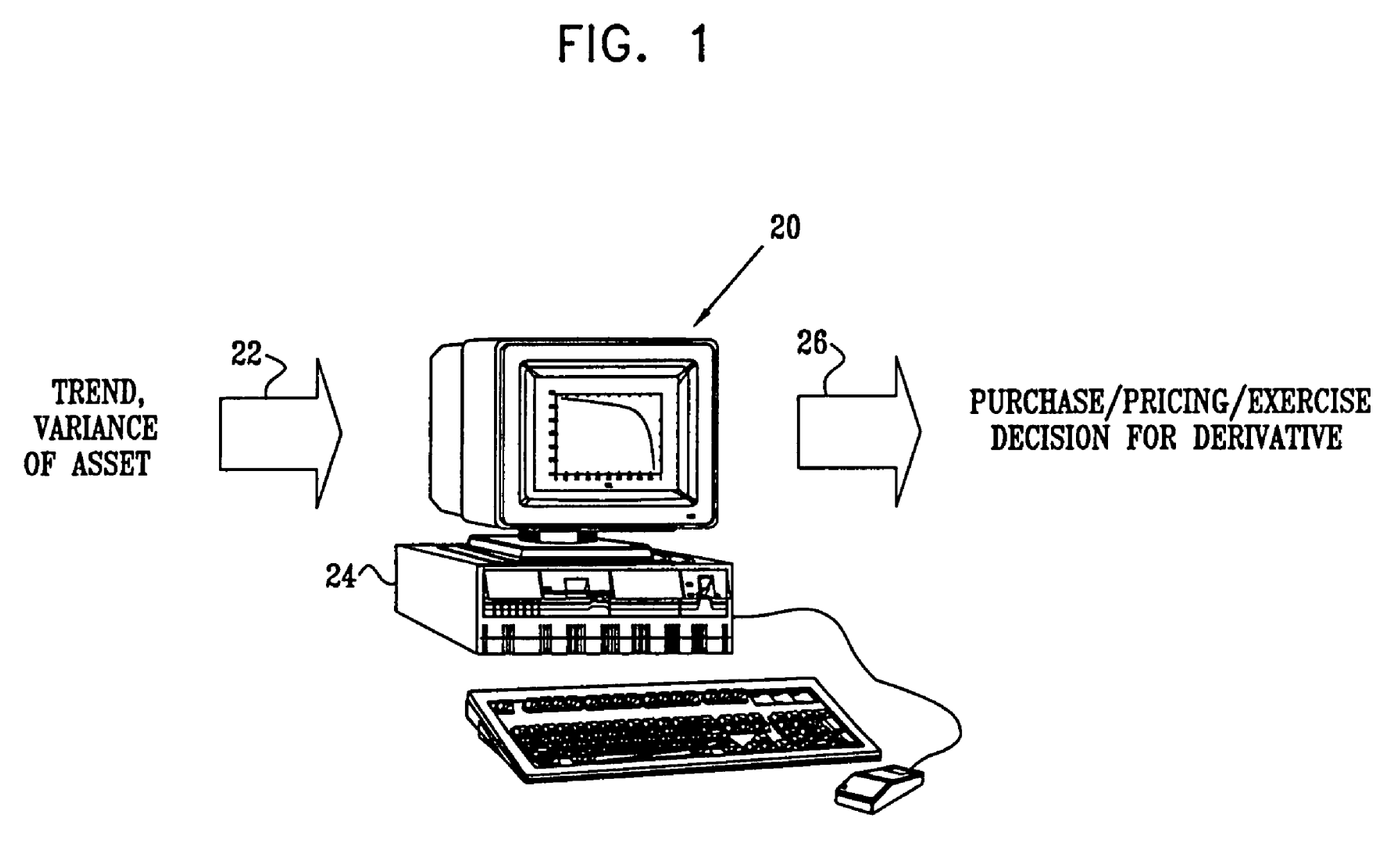
FIG. 1 is a schematic, pictorial representation of apparatus for evaluation and decision-making with respect to financial derivatives, in accordance with a preferred embodiment of the present invention.

FIG. 1 is a schematic, pictorial illustration of decision processor 20 for evaluation of financial instruments, particularly derivatives, in accordance with a preferred embodiment of the present invention. Typically, processor 20 comprises an input interface 22, through which the processor receives input information regarding trends governing the behavior of a certain asset, preferably along with a group of other related assets and/or other variables. It also receives a measure of the variance in the price of the asset, which may possibly be in the form of a covariance matrix between the asset and the other related assets and/or variables. Alternatively or additionally, processor 20 may be programmed to extract trend and variance characteristics from raw data regarding the asset itself and other related factors. Various methods for determining the trend and variance are known in the art and are beyond the scope of the present invention.

Processor 20 comprises a central processing unit (CPU) 24, which uses the trend and variance information to find a probability distribution of the asset price over time, based on methods described hereinbelow. The probability distribution function is used in making decisions with respect to trading in derivatives based on the asset, such as setting the purchase price for an option at a given time or deciding on whether to purchase the option at the going price. The probability distribution can be output via an output interface 26. The probability distribution function is similarly useful in determining when to exercise an instrument such as an American-style option. Preferably, processor 20 comprises a suitable general-purpose computer, running software designed to carry out the methods of the present invention. The software may be supplied to processor 20 in electronic form, over a network, for example, or it may be furnished on tangible media, such as CD-ROM.

For the general process S(t) represented by equation (1), a probability distribution $Pr(x \leq dS < x+dx)$ and a corresponding density function $\Phi(t,x)$ are related by the equation:

$$Pr(x \leq dS < x+dx) = dx^* \Phi(t+dt, x) \quad (2)$$

Here x=S(t+dt). Setting y=S(t), we can write the Chapman-Kolmogorov equations for S in the form:

$$dx^* \Phi(t+dt, x) = \int \Phi(t, y)^* Pr(x-y \leq dS < x-y+dx | y) dy \quad (3)$$

This equation gives the density function at time t+dt as an integral of the function at time t.

A difficulty in calculating the integral in the form of equation (3) is that it must be found based on the normal distribution of the Wiener differential dW. In preferred embodiments of the present invention, however, dW is replaced by a random variable z, with statistically-independent discrete components $z_1$. The variable z has a distribution function $\Delta(z)$ with a mean of 0 and a variance of 1, like dW. Preferably, $\Delta(z)$ is a convex combination of mutually-translated Dirac delta functions:

$$\Delta(z) = \sum_{r=1}^{m} \alpha_r \delta(z - z_m) \quad (4)$$

wherein $\Sigma \alpha_r = 1$ and $\alpha_r > 0$. Most preferably, there is one delta function at the origin of the axes (z=0), and an additional pair of delta functions displaced to either side of the origin along each of the axes so as to give the desired mean and variance. Thus, $\Delta(z)$ comprises three delta functions when S is one-dimensional, five delta functions in the two-dimensional case, and so forth.

It is now possible to simplify equation (3) using an integration variable v given by:

$$v = \frac{x - y - \mu(y) * dt}{\sigma(y) * \sqrt{dt}} \quad (5)$$

and having a probability distribution $\Delta_z$ given by equation (4). As a result of substituting $v$ for $dW$, equation (3) takes the following approximate form:

$$\Phi(t+dt, x) = \int \Phi(t, y) * \Delta_z(v) * \frac{dy}{|det(\sigma(y) * \sqrt{dt})|} \quad (6)$$

On account of the central limit theorem and the normal distribution of $\Delta_z$, when the time step $dt$ goes to zero, this approximation becomes an exact formula.

Substituting the selected probability distribution $\Delta_z$ from equation (4), the integral of equation (6) turns into a sum (for small $dt$):

$$\Phi(t+dt, x) = \sum_{r=1}^{m} \frac{\alpha_r \Phi(t, y)}{det(Jac(y))} \quad (7)$$

For each given value of $x$, equation (7) is computed using the respective values of $y=y_x(v_r)$ that satisfy:

$$y+\mu(y)*dt+\sqrt{dt}*\sigma(y)*v=x \quad (8)$$

These values of $y$ are preferably solved for explicitly when possible, or are alternatively determined by methods of approximation known in the art, such as the Newton-Raphson method. The Jacobean of $y$, $Jac(y)$, at the values of $y=y_x(v_r)$ that solve equation (8), is given by:

$$Jac(y) = \frac{\partial x}{\partial y} = I + \frac{\partial}{\partial y}(\sigma(y) * \sqrt{dt} * v + \mu(y) * dt) \quad (9)$$

wherein $I$ is the identity matrix.

The first derivative of the density function $\Phi$ is calculated at these same values of $y_x$ to be:

$$\frac{\partial \Phi(t+dt, x)}{\partial x} = \sum_{r=1}^{m} \alpha_r \left[ \frac{\partial \Phi(t, y)}{\partial y} - \frac{\Phi(t, y)}{det(Jac(y))} * \frac{\partial(det(Jac(y)))}{\partial y} \right] * \frac{(Jac(y))^{-1}}{det(Jac(y))} \quad (10)$$

Thus, for each selected value of $x$ at time $t+dt$, equations (7) and (10) enable the density function $\Phi$ and its derivative to be calculated with high precision by a straightforward procedure of summation over values of the density function at certain corresponding points at the preceding time increment $t$.

Figure 2:
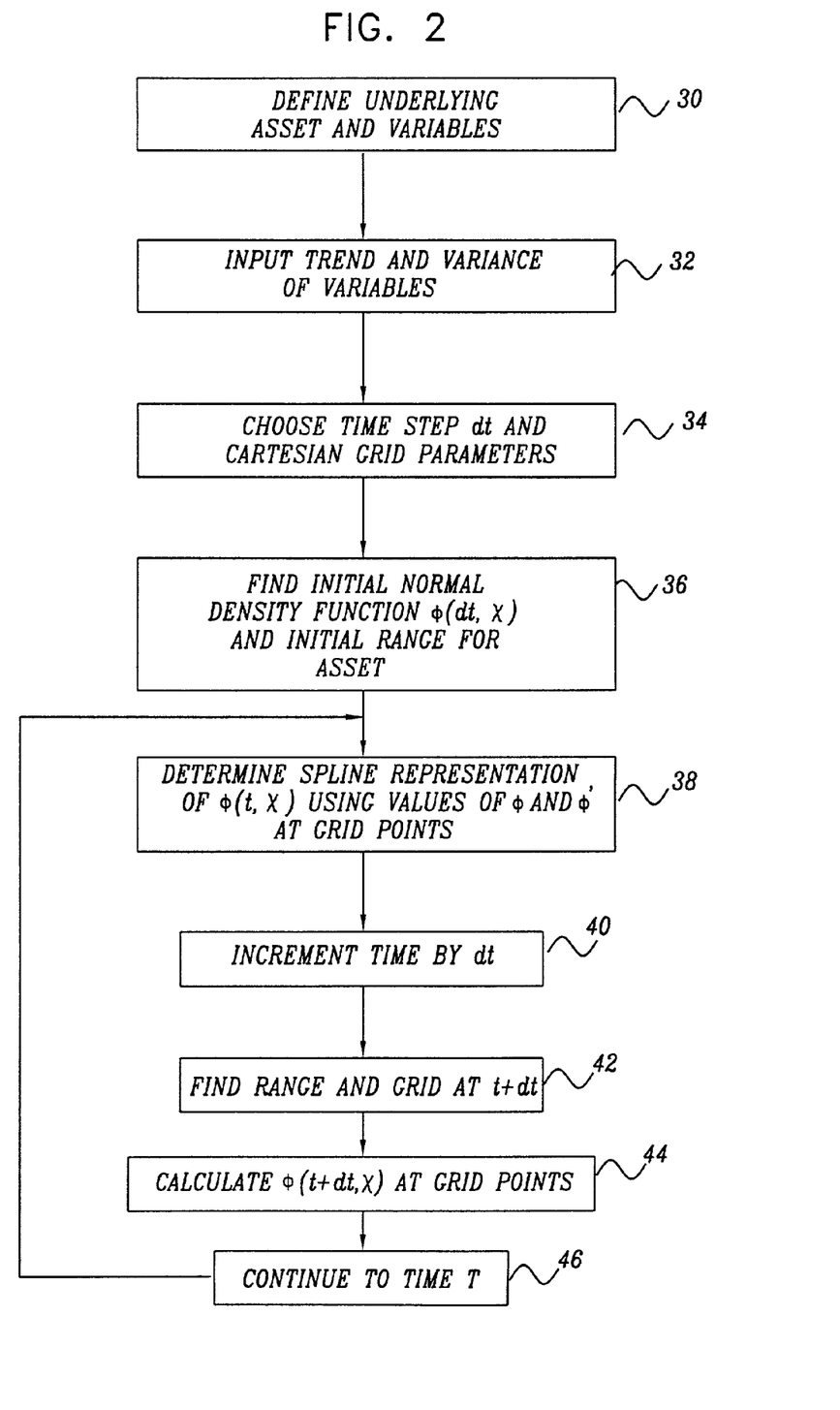
FIG. 2 is a flow chart that schematically illustrates a method for finding a probability distribution of future values of an asset, in accordance with a preferred embodiment of the present invention.

FIG. 2 is a flow chart that schematically illustrates a method for determining the probability distribution of the future price of an asset, using the computational technique described above, in accordance with a preferred embodiment of the present invention. At a definition step 30, the asset of interest is identified, preferably along with other variables that have a known impact on the asset price. The asset price and other variables are arrayed in a vector S, as described above. Alternatively, S may be a scalar value of the price, independent of other variables. A trend function $\mu(S,t)$ and a variance (or covariance) $\sigma(S,t)$ are determined by processor 20 or are input to the processor, at an input step 32. As noted above, how the trend and variance are determined is beyond the scope of the present invention, and any suitable method known in the art may be used for this purpose.

In order to begin the calculation, a time step size $dt$ and Cartesian grid parameters are selected, at a discretization step 34. The grid parameters define the number of cells to compute along each axis of S for each time $dt$ (or equivalently, the size of the step $dx$). To initiate the calculation at time $dt$, a normal density function is preferably used, at an initialization step 36. In other words, $\Phi(dt,x)$ has a normal Gaussian form, as is known in the art. The inventors have found that beginning the process with a smooth density function, rather than the approximate distribution function $\Delta$ used subsequently, enhances the precision of the calculation.

Preferably, in multidimensional cases, the axes of S are rotated to new axes x', in which the components of S are mutually orthogonal, as is known in the art. An initial range R(dt) in the rotated coordinates x' is chosen to be a parallelepiped within which the initial density function $\Phi(dt,x')$ is greater than or equal to a small value $\epsilon$. The parallelepiped is divided up into cells, of a size determined by the Cartesian grid parameters, in order to determine the grid points to use for calculation of the density function at the next time increment. The grid is then transformed back to the original x coordinates in order to find the density function $\Phi(t+dt,x)$ for the next time step $dt$. This rotation and re-rotation of the axes is preferably repeated in order to find the range and density function at each subsequent time step.

For each time $t+dt$, the density function $\Phi(t+dt,x)$ will be determined at the points of the Cartesian grid within the determined range at that time step, and this function will provide the values of $\Phi(t,y)$ for the next time step. In order to calculate $\Phi(t+dt,x)$ at the next increment however, it is necessary to know the values of $\Phi(t,y)$ at the intermediate points $y_x(v)$ given by equation (8), which are generally not identical with the grid points. For this reason, at a spline fitting step 38, cubic polynomials are calculated in order to interpolate $\Phi(t,y)$ between each pair of the grid points. In other words, processor 20 performs a sort of finite element analysis in order to find the best polynomial coefficients to use within each cell, i.e., between each pair or group of neighboring points. The coefficients are chosen so as to match the values of $\Phi$ and of its first derivative, given respectively by equations (7) and (10), at all of the grid points. The resultant polynomial representation of $\Phi(t,y)$ is then continuous up to at least its first derivative over the entire range of the density function. The inventors have found this finite-element representation of the density function to give precise results, while limiting the amount of calculation resources and memory that must be used to determine and store the values of the density function at each step. Alternatively, assuming $\Phi(t,x) \geq 0$, the finite elements between the grid points can be represented as $\exp[f(x)]$, wherein $f(x)$ is preferably a cubic polynomial.

Once the density function at time $t$ has been determined and interpolated, the time is incremented to $t+dt$, at a time advance step 40. A new range is found for the next calculation, at a range determination step 42. This determination is based on substantially the same method described above with reference to step 36, by finding the parallelepiped $R(t+dt)$ in which the density function $\Phi(t,y)$ is above a predetermined minimum. As before, the axes of S are preferably rotated for this purpose. The range is divided up into cells for the next calculation, and $\Phi(t+dt,x)$ and its derivative are determined using equations (7) and (10). Steps 38 through 44 are repeated until the process reaches a predetermined terminal time T, at a termination step 46. The result is a complete description of the probability distribution of S (and thus of the value of the asset), in the form of the density function Φ, as it develops over time from a known, initial point up to some future time. This description is used to make a variety of decisions with regard to trading in derivatives of the asset, as described further hereinbelow.

Figure 3:
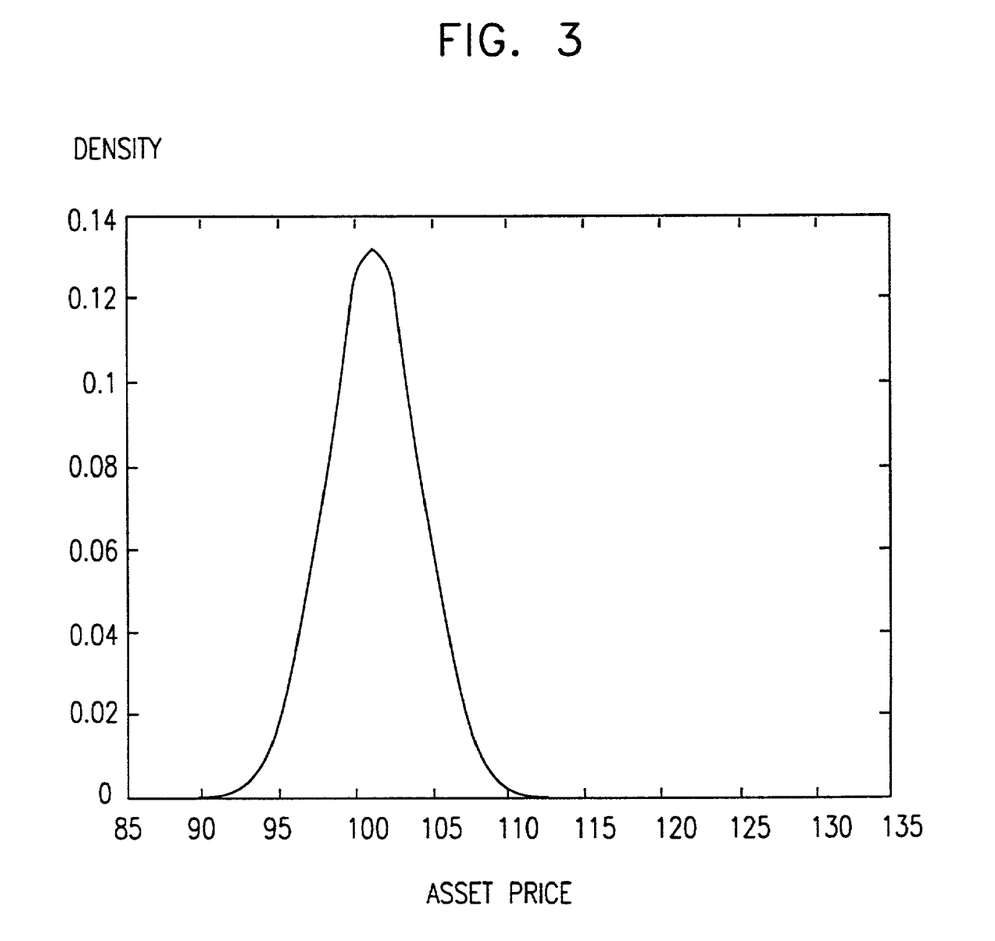
FIG. 3 is a plot that schematically illustrates a density function determined using the method of FIG. 2.

FIG. 3 is a plot that schematically illustrates a density function calculated using the method of FIG. 2. In this example, for simplicity, a one-dimensional process is defined in which the initial asset price $S^0=100$. An arbitrary trend function is given by $\mu=0.1\sqrt{S}$, while the variance is $\sigma=0.3\sqrt{S}$. The calculations are made on a one-dimensional grid of 12 points. After 50 time steps (with dt=0.02), the density function has the form shown in FIG. 3.

Figure 4:
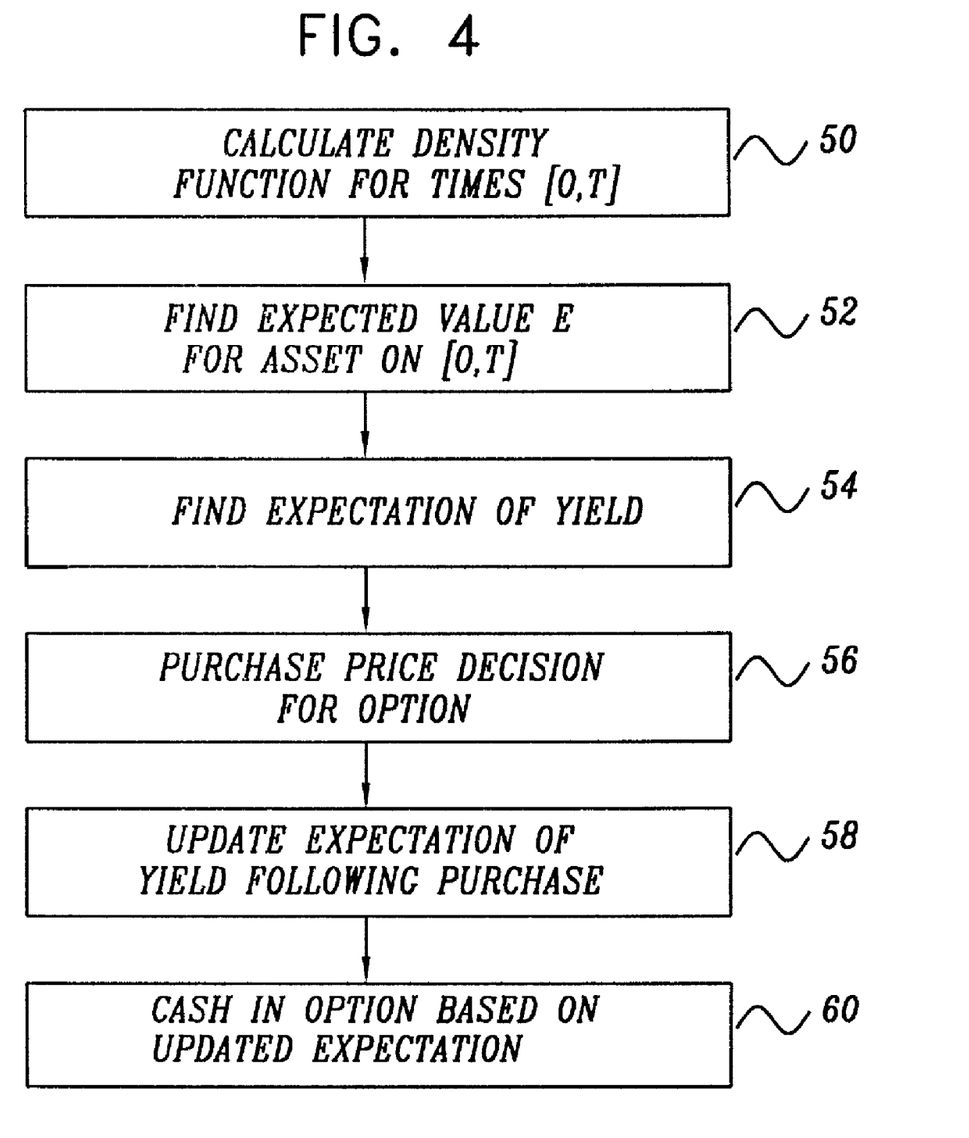
FIG. 4 is a flow chart that schematically illustrates a method for determining and implementing a trading strategy with respect to a derivative, in accordance with a preferred embodiment of the present invention.

FIG. 4 is a flow chart that schematically illustrates a method for determining and implementing a strategy for trading in a derivative, in accordance with a preferred embodiment of the present invention. At a density function calculation step 50, the density function Φ(t+dt,x) for an asset underlying the derivative is determined, using the methods described above. The density function is calculated over a chosen period from a starting time t=0 to a closing time t=T. The density function can be used in a straightforward way, at a value prediction step 52, to find the expected value E of the instrument I(x) at any time t during the period:

$$E = \int_{-\infty}^{\infty} \Phi(t+dt, x) * I(x) dx \quad (11)$$

Figure 5:
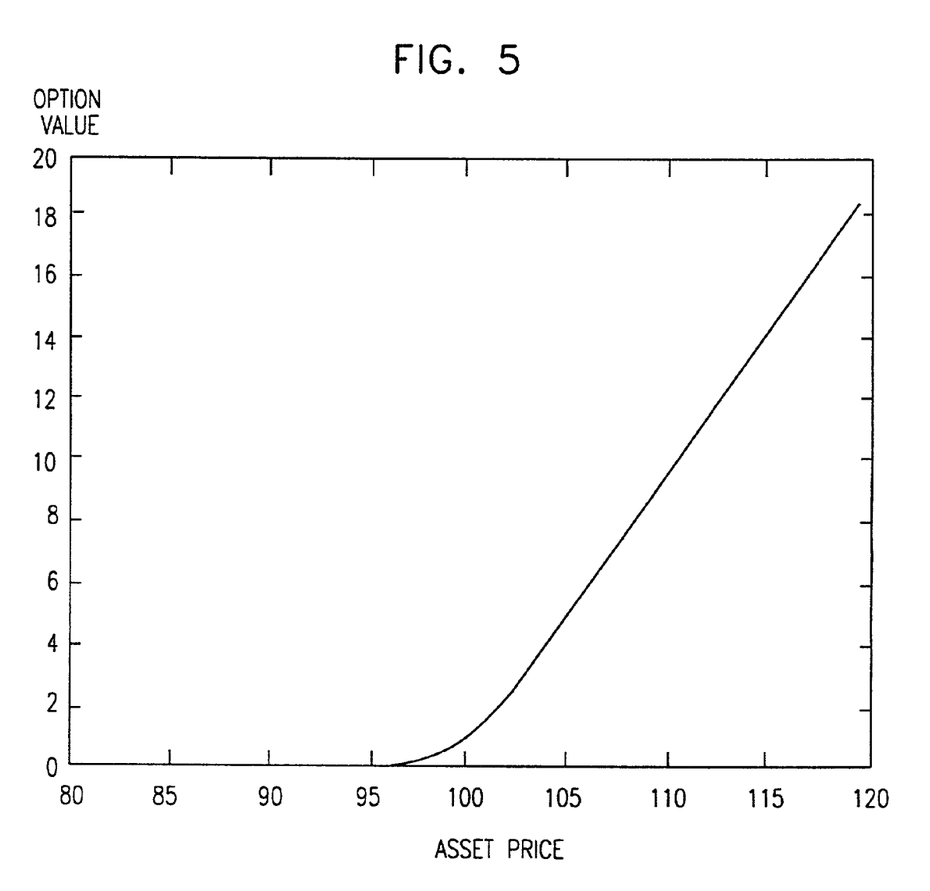
FIG. 5 is a plot that schematically illustrates an estimate of the value of an option relative to a market price of an underlying instrument, determined using the method of FIG. 2.

FIG. 5 is a plot of the expected value of a call option as a function of current asset price, determined using equation (11) and the density function shown in FIG. 3. The plot is calculated for time t=0.6. The call option has a value I(x) given by:

$$I(x)=(x-K)^+=\max(0,x-K) \quad (12)$$

Here K is the option price. For $K=S^0=100$ (the asset value at t=0), the expected value of the instrument I(x) is 1.77.

Returning now to FIG. 4, the technique described above is used by the trader in determining the expected yield of the instrument in question, at a yield expectation step 54. For a vanilla European option, the yield takes into account the present value (at time t=0) of the expected value of the instrument I(t,S) at time T. In other words, given an interest rate r(t), the expected yield V(t,S) of the European option is given by:

$$V(T, S(T)) = I(T, S) * \exp\left(-\int_0^T r(t)dt\right) \quad (13)$$
$$V(t, S) = E(V(t+dt, S(t+dt)) | S(t) = S)$$

Using the density function calculation technique exemplified in equations (7) and (10) above, the expected yield of the instrument at time t can be determined by integrating back over time, using a grid of points and the formulas:

$$V(t, y) = \sum_{j=1}^{m} \alpha_j * V(t+dt, x) \quad (14)$$
$$\frac{\partial V(t, y)}{\partial y} = \sum_{j=1}^{m} \alpha_j \frac{\partial V(t+dt, x)}{\partial x} * Jac(y)$$

This expected value is used by the trader, at a decision step 56, in determining the price at which the instrument should be sold or, alternatively, in deciding whether to buy the instrument at a given offering price.

For an American option, determining the expected yield is more complicated, because the option can be exercised at any time, and not only at time T. In this case, the yield V at time t is given by:

$$V(t, S) = \max\begin{cases} I(t, S) * \exp\left(-\int_0^t r(t)dt\right) \\ E(V(t+dt, S(t+dt)) | S(t) = S) \end{cases} \quad (15)$$

The expected yield of the instrument is then determined by integrating using the formulas:

$$V(t, y) = \max\begin{cases} I(t, y) * \exp\left(-\int_0^t r(t)dt\right) \\ E(V(t+dt, x)) = \sum_{j=1}^{m} \alpha_j * V(t+dt, x) \end{cases} \quad (16)$$

$$\frac{\partial E(V(t+dt, x))}{\partial y} = \sum_{j=1}^{m} \alpha_j \frac{\partial V(t+dt, x)}{\partial x} * Jac(y)$$

When the trader has purchased an American option, he or she must subsequently decide whether to hold the option until the end of the option period, or to exercise it at some intermediate time. For this purpose, the trader preferably updates the expected yield calculation of equation (16) from time to time during the life of the option, at an update step 58. The expected yield depends on the current price of the underlying asset. The values of (t,x) for which E(V(t+dt,x)) is equal to the current value of the instrument $$I(t, y) * \exp\left(-\int_0^t r(t)dt\right)$$

define a strategy surface on which the trader is ambivalent as to whether to exercise the option or not. When the asset price moves above the surface by a significant amount (or below, depending on the type of option), it is likely that the option should be exercised.

Figure 6:
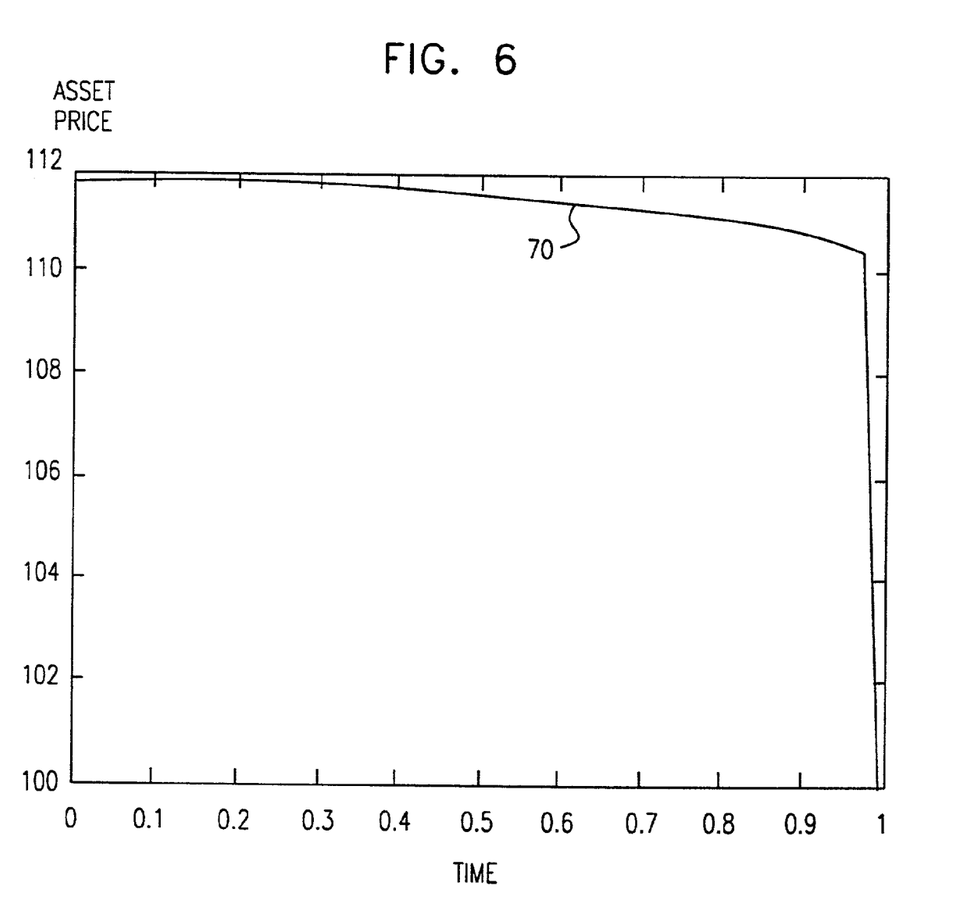
FIG. 6 is a plot that schematically illustrates a strategy function for use in determining when to exercise an option, in accordance with a preferred embodiment of the present invention.

FIG. 6 is a plot that schematically illustrates a strategy function used by an options trader, based on equation (16) above, in determining whether or not to exercise an American call option. The parameters of the option are the same as those described above with reference to FIGS. 3 and 5, with an option price K=100. A strategy surface 70 is defined by equation (16). At any time up to the final exercise time T=1, if the asset price rises above surface 70, the option should be exercised. Thus, for example, if the asset price S reaches 111 at time t=0.9, the trader should call the option.

The methods of FIGS. 2 and 4 can be applied, mutatis mutandis, to path-dependent instruments, as well. For this purpose, a general path-dependent financial instrument φ is defined by a generator function F, such that:

$$\phi(t+dt)=F(t+dt,\phi(t),S(t+dt)) \quad (17)$$

This definition signifies that the value of the instrument at any time is a function both of the current value of the underlying asset S and of the earlier value of the instrument itself. For example, for an Asian call option whose exercise price is the average of j samples of the value of the underlying asset preceding the present sample, the generator function will be $\phi(t_{j+1})=F(t_{j+1}, \phi(t_j), S(t_{j+1}))=(j*\phi(t_j)+S(t_{j+1}))/(j+1)$. Generator functions may similarly be determined for options that are dependent on other types of averages (such as geometric averages) or on past maximum or minimum values of the underlying asset.

The density function of $\phi$ is defined as $\Phi(t+dt,x_1, x_2)$, wherein the variable $x_1$ corresponds to the value of the instrument, and $x_2$ to the value of the underlying asset. In order to evaluate the path-dependent instrument, its cumulative density function $\Psi$ is defined as follows:

$$\Psi(t, x_1, x_2) = \int_0^{x_1} \Phi(t, x_1', x_2) dx_1' \tag{18}$$

Following a derivation similar to that used to find equations (7) and (10) above, the following expressions are found to represent the cumulative density function $\Psi$ at each point in time t+dt, and for each of the grid points in the $(x_1,x_2)$ multidimensional space:

$$\Psi(t+dt, x_1, x_2) = \sum_{r=1}^m \frac{\alpha_r}{det(Jac(y_2))} * \Psi(t, y_1, y_2) \tag{19}$$

$$\frac{\partial \Psi(t+dt, x_1, x_2)}{\partial x_1} = \sum_{r=1}^m \frac{\alpha_r}{det(Jac(y_2))} * \frac{\partial \Psi(t, y_1, y_2)}{\partial y_1} * \frac{\partial y_1}{\partial x_1} \tag{20}$$

$$\frac{\partial \Psi(t+dt, x_1, x_2)}{\partial x_2} = \tag{21}$$

$$\sum_{r=1}^m \frac{\alpha_r}{det(Jac(y_2))} * \left\{ \frac{\partial \Psi(t, y_1, y_2)}{\partial y_2} - \Psi(t, y_1, y_2) * \frac{\partial det(Jac(y_2))}{\partial y_2} * \right.$$
$$\left. (det(Jac(y_2)))^{-1} + \frac{\partial \Psi(t, y_1, y_2)}{\partial y_1} * \frac{\partial y_1}{\partial y_2} \right\} * (Jac(y_2))^{-1}$$

As in the case of equations (7) and (10), at each iteration in finding the density function $\Psi(t+dt)$ and its derivatives, equations (19), (20) and (21) are evaluated at points $y_2=y_{2,x_2}(v_r)$, and $y_1=z_r(x_1, y_{2,x_2}(v_r))$. These points represent solutions of the equation:

$$F(t, z_r, y_{2,x_2}(v_r))=x_1 \tag{22}$$

for grid points $(x_1,x_2)$, with the integration variable v as defined above in equation (5).

Following substantially the same procedures described above with reference to FIGS. 2 and 4, the cumulative density function $\Psi$ is calculated at each time step dt, up to the designated final time T. Finite-element interpolation is used to find the values of $\Psi$ in between the grid points. This density function is then used to evaluate the expected value of the instrument $\phi$ and its yield, as well as to derive and apply strategy functions, similar to that shown in FIG. 6. By appropriate choice of the generator function and integration conditions, this method may be applied to both American and European-style path-dependent options, as well as to floating strike, barrier and substantially any other type of option currently known in the art.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for trading in a financial derivative of an underlying asset, comprising:
    determining a trend of a stochastic process, which is predictive of a future value of the asset and a predicted variance of the future value;
    using a computer to calculate a first density function indicative of a probability distribution of the value at a first time in the future responsive to the trend and the variance;
    calculating a second density function based on the first density function at the first time, by integrating a random variable representative of the stochastic process over the first density function at the first time to find the probability distribution of the value at a second time, subsequent to the first time, wherein the random variable has a plurality of discrete values with a normal probability distribution and the random variable comprises a convex superposition of mutually-translated delta functions comprising at least the following formula;

$$\Delta(z) = \sum_{r=1}^m \alpha_r \delta(z-z_m), \text{ and}$$

computing at least one of an expected value of the asset and an expected yield of the financial derivative based on the second density function as a basis for making a trading decision with regard to the derivative of the asset.

2. A method according to claim 1, wherein integrating the random variable comprises computing an integrated value of the density function at each of a plurality of grid points in a coordinate space, wherein the value of the asset is represented by a coordinate in the space.

3. A method according to claim 2, wherein computing the integrated value comprises, for each of the plurality of grid points:
    finding one or more corresponding points in the coordinate space at the first time, such that in a time step from the first time to the second time, the random variable makes a transition from the one or more corresponding points to the grid point at the second time; and
    determining the function at the grid point at the second time by summing over the density function at the corresponding points.

4. A method according to claim 2, wherein recalculating the density function comprises interpolating the density function intermediate the grid points so as generate a smooth function over a selected range of calculation.

5. A method according to claim 4, wherein computing the integrated value comprises computing the value and a first derivative of the density function at the second time, and wherein interpolating the density function comprises fitting polynomial functions between the grid points so as to match the value and the first derivative of the density function computed at each of the grid points.

6. A method according to claim 5, and comprising recalculating the density function at a third time, subsequent to the second time, using the polynomial functions fitted between the grid points at the second time.

7. A method according to claim 1, wherein recalculating the density function comprises iteratively recalculating the density function at each of a plurality of times from the first time up to a final time.

8. A method according to claim 1, wherein determining the trend comprises defining a vector having elements that comprise a plurality of related variables that include the value of the asset, and finding a multivariate trend with respect to the plurality of related variables by modeling a change in the vector over time as a multidimensional Wiener process.

9. A method according to claim 8, and comprising finding a covariance matrix with respect to the plurality of related variables, wherein computing the density function comprises applying the covariance matrix in calculating the probability distribution of the future value of the asset.

10. A method according to claim 8, wherein the density function comprises a multivariate function, based on at least some of the plurality of related variables, in a multidimensional coordinate space.

11. A method according to claim 1, wherein making the trading decision comprises deciding whether to carry out a transaction in the financial derivative at a given transaction price.

12. A method according to claim 1, wherein the financial derivative comprises an option exercisable at any of a plurality of points in time, and wherein making the trading decision comprises determining at which of the points to exercise the option.

13. A method according to claim 12, wherein determining at which of the points to exercise the option comprises calculating a strategy function that is indicative of an expected value of a yield of the option, and deciding whether to exercise the option by comparing a current value of the asset to the expected value of the yield at one or more of the points in time.

14. A method according to claim 1, wherein the derivative comprises a path-dependent option, and wherein recalculating the density function comprises computing a cumulative density function by integrating the density function over time.

15. A method according to claim 14, wherein computing the path-dependent density function comprises finding a cumulative density function indicative of a path-dependent probability distribution of a value of the option.

* * * * *